US006792443B2

(12) United States Patent
Tang (10) Patent No.: US 6,792,443 B2
(45) Date of Patent: *Sep. 14, 2004

(54) ECONOMICAL ON-THE-FLY ROUNDING FOR DIGIT-RECURRENCE ALGORITHMS

(75) Inventor: Ping Tak Peter Tang, Hayward, CA (US)

(73) Assignee: Intel Corporation, Santa Clara, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 09/895,770

(22) Filed: Jun. 29, 2001

(65) Prior Publication Data

US 2003/0009501 A1 Jan. 9, 2003

(51) Int. Cl.[7] .................................................. G06F 7/38
(52) U.S. Cl. ........................ 708/551; 708/504; 708/510
(58) Field of Search ................................. 708/550, 551, 708/496, 497, 499, 502, 504, 510, 605, 650, 653, 655, 656, 670

(56) References Cited

U.S. PATENT DOCUMENTS

| 5,787,030 A | * | 7/1998 | Prabhu et al. | ............... 708/650 |
| 5,870,323 A | * | 2/1999 | Prabhu et al. | ............... 708/650 |
| 5,954,789 A | * | 9/1999 | Yu et al. | ..................... 708/495 |

OTHER PUBLICATIONS

Nannarelli, Alberto, "Low Power Division and Square Root," Dissertation, University of California, Irvine, 1999.
Oberman, Stuart F., et al., "Division Algorithms and Implementations, " IEEE Transactions on Computers, vol. 46, No. 8, Aug. 1997, pp. 833–854..
Oberman, Stuart F., et al., "An Analysis of Division Algorithms and Implementations," Technical Report: CSL–TR–95–675, Computer Systems Laboratory, Jul. 1995.

* cited by examiner

Primary Examiner—Chuong Dinh Ngo
(74) Attorney, Agent, or Firm—Blakely, Sokoloff, Taylor & Zafman LLP (57) ABSTRACT

Apparatus and methods are provided for an improved on-the-fly rounding technique for digit-recurrence algorithms, such as division and square root calculations. According to one embodiment, only two forms of an intermediate result of an operation to be performed by a digit-recurrence algorithm are maintained. A first form is maintained in a first register and a second form is maintained in a second register. Responsive to receiving digits 1 to L–2 of the intermediate result from a digit recurrence unit, where L represents a number of digits that satisfies a predetermined precision for the operation, both forms of the intermediate result are updated by register swapping or concatenation under the control of load and shift control logic and on-the-fly conversion logic. Then, a rounded result is generated by determining digits $d_{L-1}$ and $d_L$ and appending a rounded last digit to the appropriate form of the intermediate result.

30 Claims, 7 Drawing Sheets

ECONOMICAL ON-THE-FLY ROUNDING FOR DIGIT-RECURRENCE ALGORITHMS

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

BACKGROUND OF THE INVENTION

1. Field of the Invention

The invention relates generally to implementations of floating-point calculations involving digit-by-digit methods in which the digits generated are in redundant form and rounding can be performed by addition or subtraction of the last digit. More particularly, the invention relates to an improved on-the-fly rounding technique useful in connection with hardware implementations of floating-point digit-recurrence algorithms, such as division and square root calculations.

2. Description of the Related Art

Figure 1:
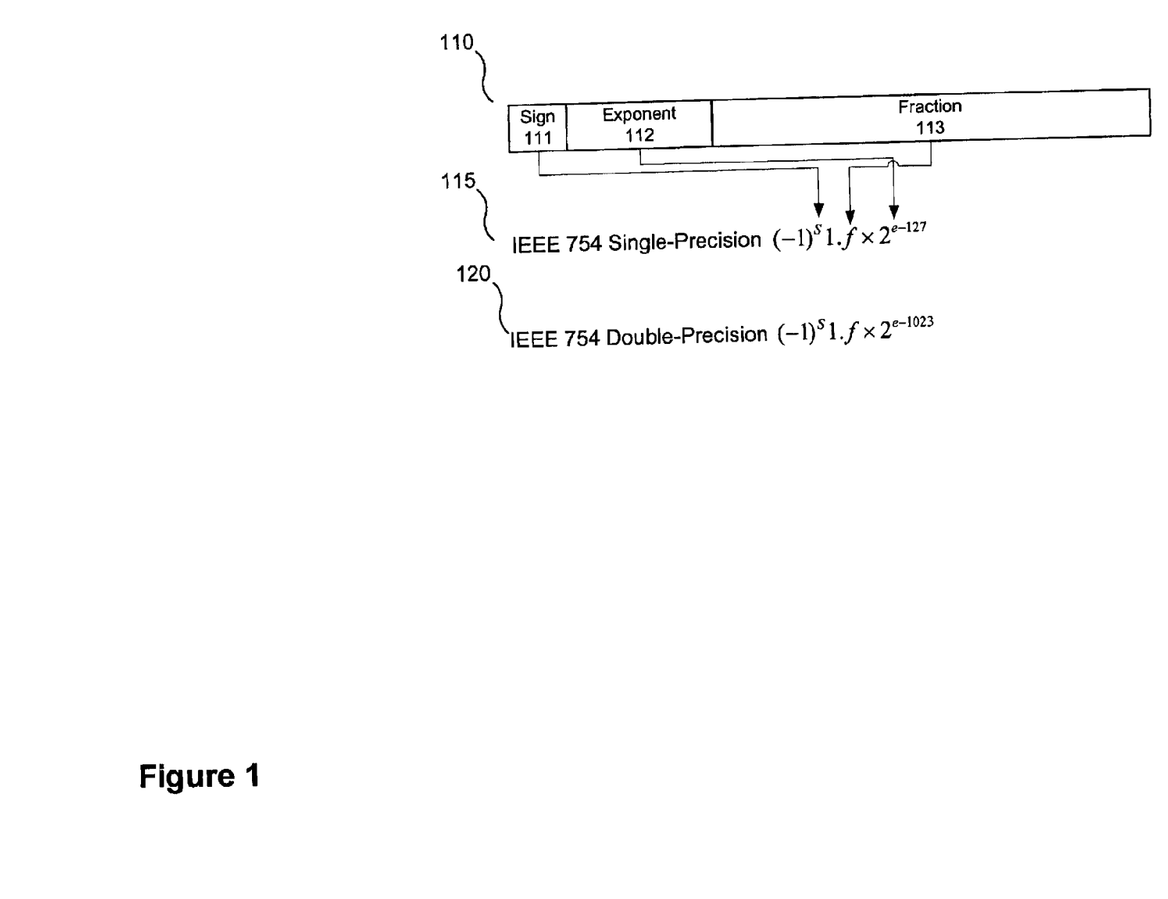
FIG. 1 illustrates an example of how floating point numbers are represented according to IEEE standard 754.

FIG. 1 illustrates examples of floating-point number representations according to American National Standards Institute (ANSI)/Institute of Electrical and Electronics Engineers (IEEE) std 754–1985 (*IEEE Standard for Binary Floating-Point Arithmetic*, 1985). In general, the floating-point representation 110 defined by IEEE standard 754 divides the binary digits into three fields: a sign field 111, an exponent field 112, and a fraction field 113. In both single-precision and double-precision, the sign field 111 is a single bit. The exponent field 112 is treated as an unsigned number, while the exponent is a signed number represented using the bias method. The exponent bias for a single-precision floating-point number 115 is 127 and for a double-precision floating-point number 120 is 1023. The fraction field 113 represents a number less than one, but the significand of the floating-point number is one plus the fraction part. When performing the division of two floating-point numbers W and X, such as:

$$W=(-1)^{S_W} w \times 2^{E_w-117} \text{ and } X=(-1)^{S_X} x \times 2^{E_x-127}$$

three different operations have to be performed on the sign, exponent, and significand to produce the quotient. Described herein are only the operations to be performed on the fractional part of the significand.

Digit-recurrence algorithms are a well-known class of algorithms for hardware implementation of floating-point digit-recurrence algorithms, such as division and square root calculations. Typically, the algorithm has a radix, r, that is usually a power of 2, $r=2^a$. At each iteration, $j=1, 2, \ldots$, a new digit $d_j$ of a fixed digit set D is generated such that $Q_j = d_1 r^{-1} + d_2 r^{-2} + \ldots + d_j r^{-j}$ converges to the infinitely precise result as J tends to infinity. Notably, in most practical algorithms, the set D is not the set $\{0, 1, 2, \ldots, r-1\}$. For example, a typical radix-4, r=4, algorithm generates digits $d_j$ such that $d_j \in \{-2, -1, 0, 1, 2\}$. In a specific precision, for example, IEEE single-precision floating-point arithmetic that requires 24 correctly rounded significant bits, an iteration number J=L is taken to be just large enough to satisfy the requirement, and a rounding procedure is then performed. In a straightforward implementation, the rounding procedure requires a carry-propagation addition to be performed which is time consuming as this carry-propagation lies in the critical path of the whole algorithm.

Figure 2:
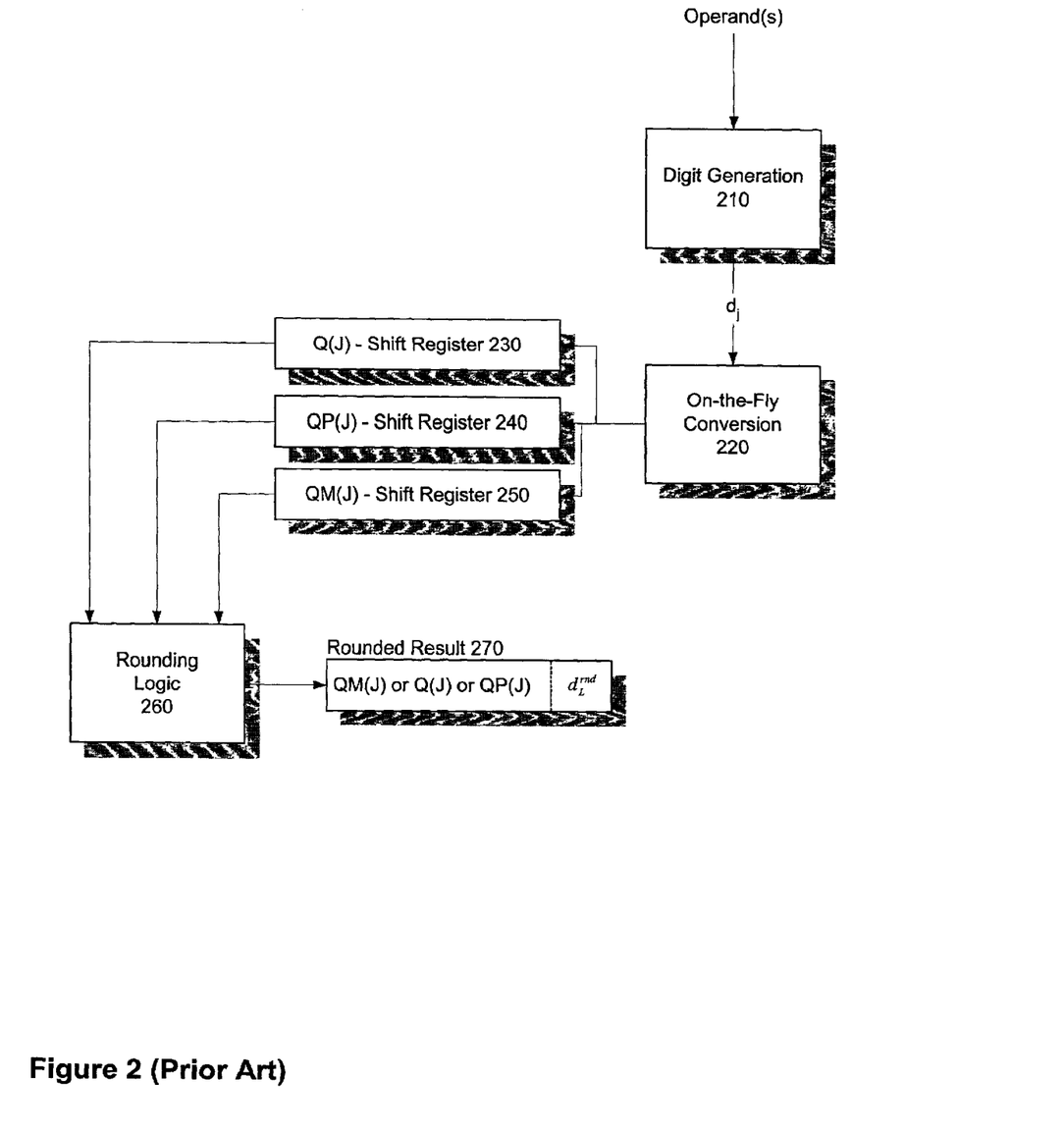
FIG. 2 is a high-level block diagram illustrating a prior approach for implementing a digit recurrence algorithm with on-the-fly rounding.

A method called "on-the-fly rounding" (described further in M.D. Ercegovac and T. Lang, On-the-fly Rounding, *IEEE Transactions on Computers*, volume 41, number 12, pp. 1497–1503, December 1992) has been devised to eliminate the need for a carry-propagation addition during the rounding procedure. However, as illustrated in FIG. 2, this existing on-the-fly rounding procedure requires three variables, Q(J), QM(J), and QP(J) to be stored. Q(J) represents the sum of intermediate digits for the $J^{th}$ iteration. QM(J) represents the intermediate sum less the unit in the last position $(Q(J)-r^{-J})$ and QP(J) represents the intermediate sum plus the unit in the last position $(Q(J)+r^{-J})$. Each of the three variables are represented by canonical digits $d_j^-$, $d_j$, $d_j^+ \in 0,1, \ldots r-1$) and must be updated during each iteration J. Numerically, $$QM(J)=d_1^- r^{-1}+d_2^- r^{-2}+\ldots+d_J^- r^{-J}$$

$$Q(J)=d_1 r^{-1}+d_2 r^{-2}+\ldots+d_J r^{-J}$$

$$QP(J)=d_1^+ r^{-1}+d_2^+ r^{-2}+\ldots+d_J^+ r^{-J}$$

When the iteration reaches J=L-1, one iteration before the last necessary for the desired precision, the on-the-fly rounding methods generate the correctly rounded result based on rounding just the last digit, $d_L$, and appending it to one of the three variables QM(L-1), Q(L-1), and QP(L-1). No carry-propagating addition is required.

The main cost of such an on-the-fly rounding method is two-fold. First, three variables must be stored whose sizes are as large as the number of bits for the precision in question. Second, each of the three variables must be updated during each iteration of the digit recurrence algorithm. This translates directly into power consumption, which is becoming increasingly important as a design consideration.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Apparatus and methods are described for an improved on-the-fly rounding technique useful in connection with hardware implementations of floating-point digit-recurrence algorithms, such as division and square root calculations. Broadly stated, according to embodiments of the present invention, the number of variables maintained and associated arithmetic and logical operations that are performed during the improved on-the-fly rounding process applied to digit recurrence algorithms are fewer than those required by state-of-the-art on-the-fly rounding approaches. According to one embodiment, the digit set, D, is restricted to one less digit than the maximal set allows. Additionally, the final on-the-fly rounded result is generated based on manipulation of the last two digits, rather than just the last one. Advantageously, in this manner, a correctly rounded result may be constructed based on the last two digits, $d_{L-1}$ and $d_L$, and only two variables, $R_{L-2}$ and $R_{L-2}^-$ (rather than three). Thus, the improved on-the-fly rounding approach described herein is capable of reducing the hardware, operations, and power consumption associated with on-the-fly rounding by a factor of one third.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include one or more machine-readable mediums having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to division computations, the apparatus and methods described herein are equally applicable to various other types of digit recurrence computations, such as square-root computations. The theory of square-root computation is widely recognized as an extension of the theory of division. Consequently, most of the analysis and conclusions for division can also be applied to the design of square-root calculation units.

Terminology

Before describing an exemplary computer system in which various embodiments of the present invention may be implemented, some terms that will be used throughout this application will briefly be defined.

"Digit recurrence" generally refers to a class of algorithms that produce a fixed number of result bits every iteration (determined by the radix) and consequently converge linearly as a function of the length of the operands. Division algorithms are typically divided into four classes: (1) digit recurrence, (2) functional iteration, (3) very high radix division, and (4) variable latency algorithms. As used herein, so called "very high radix division" (e.g., those division implementations that retire more than 10 quotient bits per iteration step), simple digit recurrence algorithms (e.g., those operation implementations, such as division, square-root, and the like, that form a result 1 to 10 digits at a time) are intended to fall within the broad definition of digit recurrence algorithms.

A "digit recurrence divider" generally refers to a division unit, implemented in hardware, software, microcode, or a combination thereof, that employs a digit recurrence algorithm to perform division computations.

A "digit recurrence square-root generator" generally refers to a square-root unit, implemented in hardware, software, microcode, or a combination thereof, that employs a digit recurrence algorithm to perform square-root computations.

"Digit recurrence division" generally refers to the process of performing division computations by way of a digit recurrence algorithm, implemented in hardware, software, microcode, or a combination thereof.

"Digit recurrence square-root generation" generally refers to the process of performing square-root computations by way of a digit recurrence algorithm, implemented in hardware, software, microcode, or a combination thereof.

"Radix" generally refers to the base of a number system. For example, 2 in the binary system, 10 in the decimal system, 8 in the octal system, and 16 in the hexadecimal system. As used herein, the range of allowed values a digit of a result (e.g., a quotient- digit) is a function of the radix. The simplest case for division is where, for radix r, there are exactly r allowed values of the quotient-digit. However, to increase performance of digit recurrence division, it is typically desirable to utilize a redundant digit set. Typically, such a digit set is composed of symmetric signed-digit consecutive integers, where the maximum digit is a, where $$a \geq \lceil \frac{r}{2} \rceil.$$

In particular, $q_j \in \delta_a - \{-a, -a+1, \ldots, a-1, a\}$. For example, in radix-4 division, the set of quotient digits, $q_j$, may be $\{-2, -1, 0, 1, 2\}$. In digit recurrence division, assuming the same quotient precision, the choice of radix determines the number of iterations required to computer the quotient. In general, the number of iterations of the algorithm required to compute the quotient is the number of quotient digits divided by the number of quotient digits, k, generated per iteration. The number of iterations required to achieve a particular precision is reduced by a factor k when the radix is increased from r to $r^k$. For example, a radix-2 algorithm retires 1 bit of quotient each iteration while a radix-4 algorithm retires 2 bits of quotient in every iteration.

Computer System Overview

Figure 3:
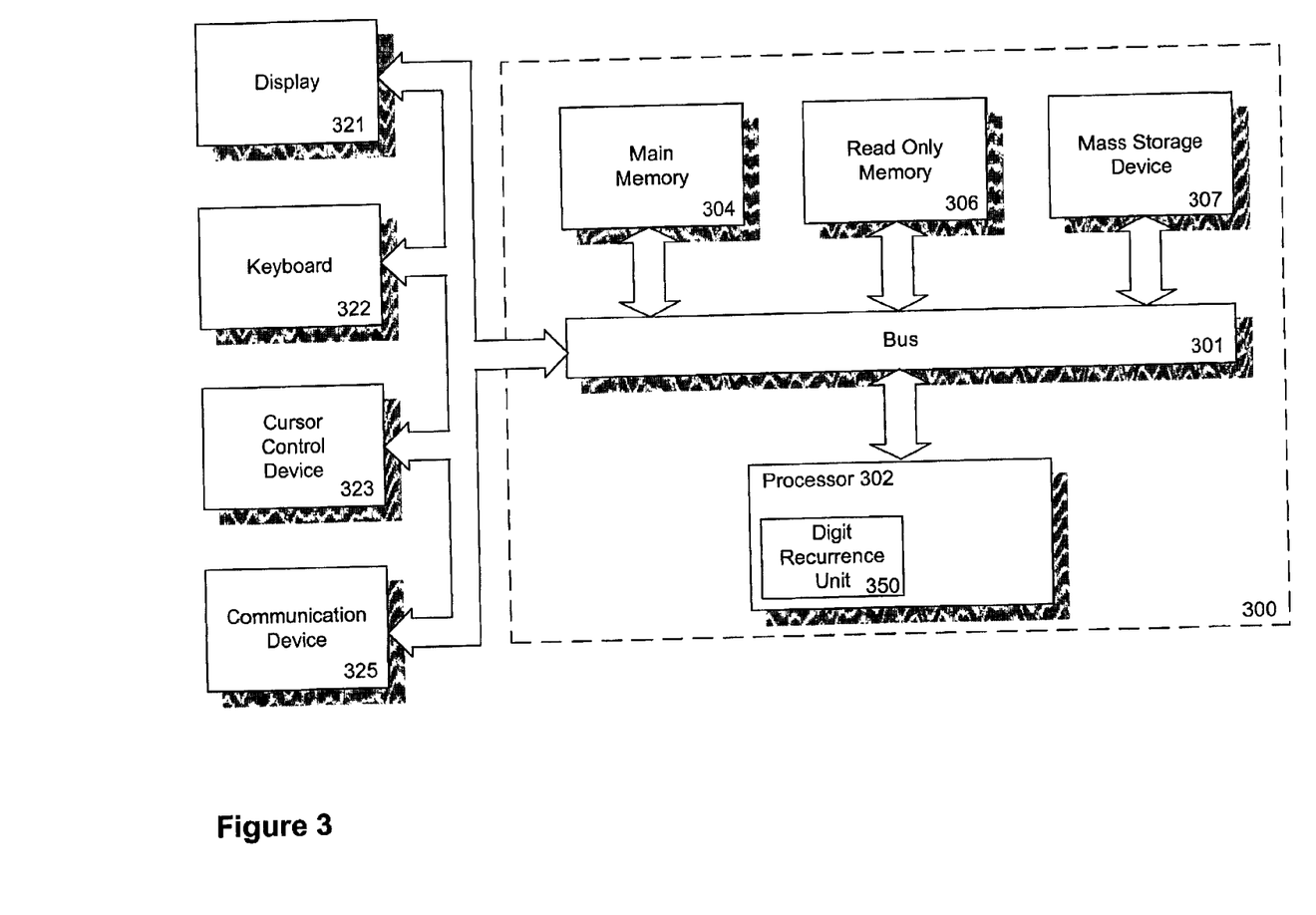
FIG. 3 is an example of a computer system in which one embodiment of the present invention may be implemented.

A computer system 300 in which features of the present invention may be implemented will now be described with reference to FIG. 3. Computer system 300 comprises a bus or other communication means 301 for communicating information, and a processing means such as processor 302 coupled with bus 301 for processing information. In this example, processor 302 includes an improved digit recurrence unit 350 that employs the on-the-fly rounding enhancements described herein. In alternative embodiments, the improved on-the-fly rounding techniques described herein may be embodied in a numeric co-processor, a floating-point co-processor, a floating-point unit (FPU), a graphics controller, a graphics accelerator, a microcontroller, a digital signal processor, or other circuitry implementing a digit recurrence algorithm.

Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302. While, embodiments of the present invention will be described with respect to hardware-based implementations, it is contemplated that the improved on-the-fly rounding techniques described herein may be embodied in machine readable instructions and stored on a machine readable medium, such as RAM 304, ROM 306, or other data storage devices.

A data storage device 307 such as a magnetic disk or optical disc and its corresponding drive may also be coupled to bus 301 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers or other servers via the Internet, for example. The communication device 325 may include a modem, a network interface card, or other well-known interface devices, such as those used for coupling to an Ethernet, token ring, or other types of networks. In any event, in this manner, the computer system 300 may be coupled to a number of clients and/or servers via a conventional network infrastructure, such as a company's Intranet and/or the Internet, for example.

High-level Hardware-based Implementation of the Improved On-the-fly Rounding

Figure 4:
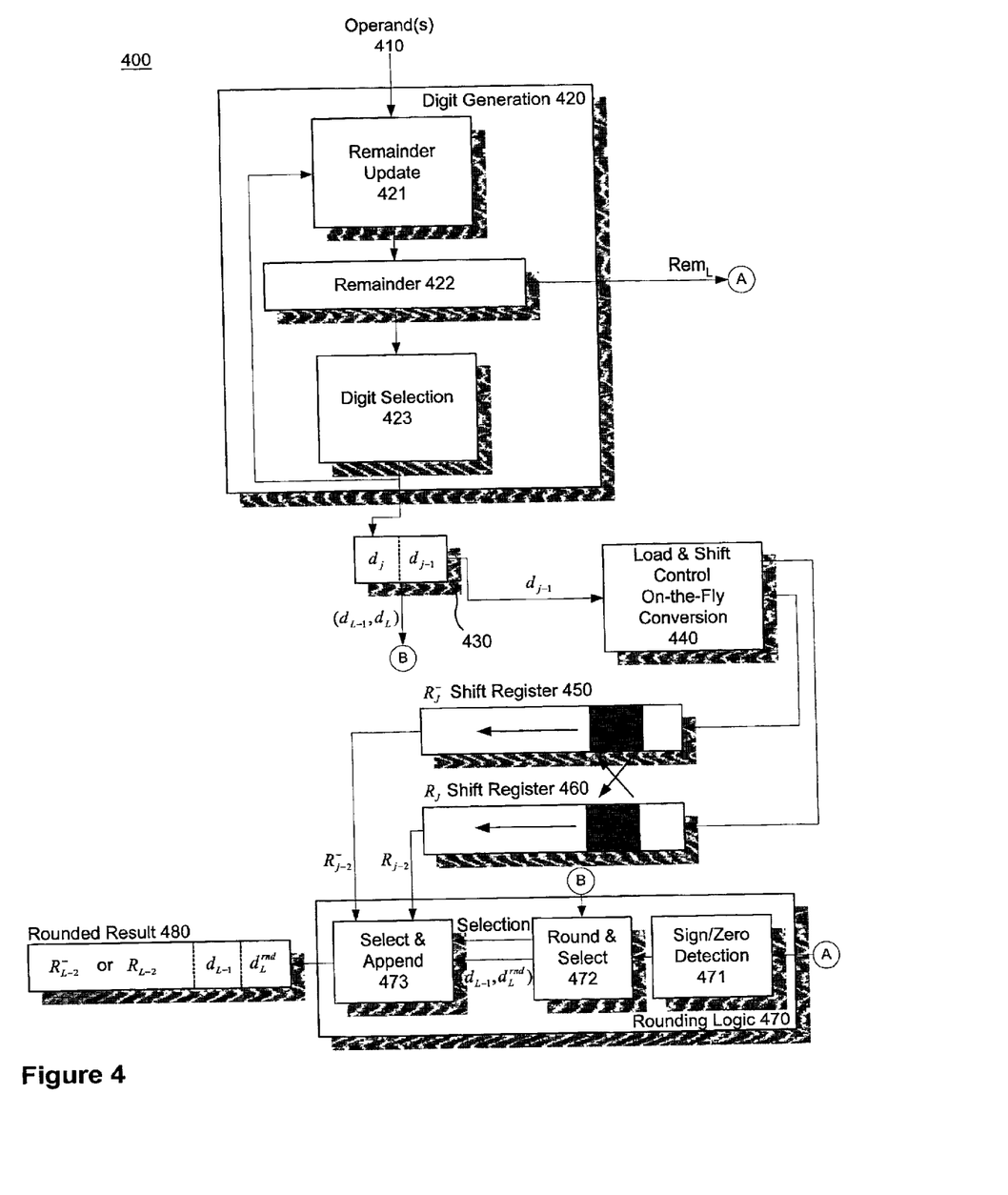
FIG. 4 is a high-level circuit diagram illustrating digit recurrence with on-the-fly rounding according to one embodiment of the present invention.

FIG. 4 is a high-level circuit diagram illustrating digit recurrence with on-the-fly rounding according to one embodiment of the present invention. In this example, hardware-based digit recurrence unit 400 includes digit generation logic 420, a digit buffer 430, load and shift control on-the-fly conversion logic 440, intermediate result shift registers 450 and 460, and rounding logic 470.

The digit generation logic 420 in this example implements a digit recurrence algorithm, either using moderate radix SRT or a very high radix method, to generate one digit, $d_j$, upon which the quotient is based per iteration of the digit recurrence algorithm. In the embodiment depicted, the digit generation logic 420 includes remainder update logic 421, a remainder register 422, and digit selection logic 423. The remainder update logic 421 receives as inputs operands 410 and the digit selected during the current iteration. The remainder update logic 420 calculates and maintains the remainder 422 during initialization, main iterations of the digit recurrence algorithm, and during a last rounded digit determination. During initialization, the remainder 422 is determined based upon the operands 410. During the main iterations and during the last rounded digit determination, the remainder 422 is based upon the current digit output by the digit selection logic 423.

The digit selection logic 423 is typically implemented as a lookup table indexed by the divisor and the current remainder for moderate radix (usually up to 16) implementations. The design and use of SRT lookup tables are well-known; therefore, further detail will not be presented herein. According to one embodiment, the lookup table is populated with values to also support root selection for square-root calculations. For very high radix implementations, the digit selection logic is typically implemented via simple arithmetic logic that performs a rounding operation on the most significant bits of the remainder. This implementation, however, involves a preprocessing step in the overall digit recurrence algorithm.

Digits output from the digit generation logic 420 are held in the digit buffer 430. The digit buffer 430 essentially operates as a two element first-in-first-out (FIFO) queue and may be implemented with a shift register or the like. As will be discussed further below, this buffering allows final rounding to be performed based on the last two digits rather than the last one as done by traditional on-the-fly rounding techniques.

The load and shift control on-the-fly conversion logic 440 receives digits from the digit buffer 430 and orchestrates swapping of the contents and/or concatenation to the contents of the intermediate result shift registers 450 and 460 to update $R_j$ (the sum of intermediate digits for the $j^{th}$ iteration) and $R_j^-$ ($R_j^{-=R}_j - r^{-j}$), where $$R_j = d_1 r^{-1} + d_2 r^{-2} + \ldots + d_j r^{-j}$$

and during each iteration, $R_j$ and $R_j^-$ may be determined based upon $R_{j-1}$, $R_{j-1}^-$, $d_j$, and the radix, r, associated with the digit recurrence algorithm as follows:

$$R_j = \begin{cases} (R_{j-1}, d_j) & d_j \geq 0 \\ (R_{j-1}^-, d_j + r) & d_j \leq -1 \end{cases}, \text{ and}$$

$$R_j^- = \begin{cases} (R_{j-1}, d_j - 1) & d_j \geq 1 \\ (R_{j-1}^-, d_j + r - 1) & d_j \leq 0 \end{cases}$$

Importantly, according to the improved on-the-fly rounding technique, $R_j^+$ ($R_j^+ = R_j + r^{-j}$) is not needed during final rounding or for any iteration. Therefore, during each iteration, only two forms of the intermediate result of the division are updated, thereby reducing the hardware requirement and power consumption by one third as compared to traditional approaches described above.

In the embodiment depicted, rounding logic 470 includes select and append logic 473, round and select logic 472, and sign/zero detection logic 471. During final rounding, $Rem_L$, the remainder at iteration L, where L represents a number of digits that satisfies a predetermined or desired precision for the operation is provided to the sign/zero detection logic 471 that generates a sign and zero signal for use by the round and select logic 472. The round and select logic 472 outputs a selection signal indicating whether the rounded result 480 should include $R_{L-2}$ or $R_{L-2}^-$, and outputs a data signal representing the last two digits, $d_{L-1}$ and $d_L^{rnd}$, of the rounded result 480.

Existing On-the-fly Rounding Processing

Figure 5:
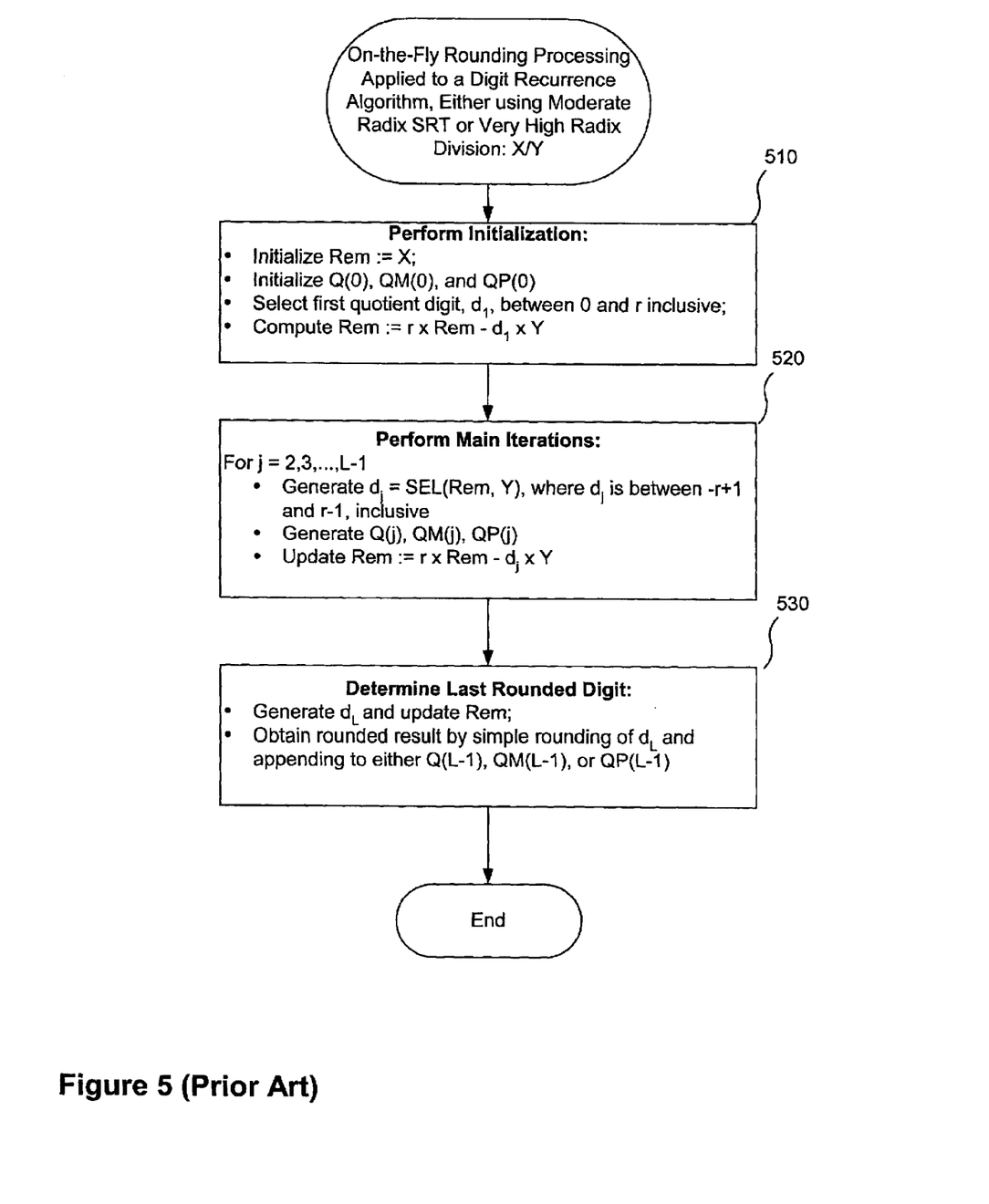
FIG. 5 is a flow diagram illustrating existing on-the-fly rounding applied to a digit recurrence algorithm, either using moderate radix Sweeney, Robertson, and Tocher (SRT) division or a very high radix method.

For purposes of comparing to the improved on-the-fly rounding technique it is useful to briefly describe traditional on-the-fly rounding processing. FIG. 5 is a flow diagram illustrating existing on-the-fly rounding applied to digit recurrence division, such as SRT or very high radix division, X/Y.

In processing block 510, initialization is performed. The remainder, Rem, is initialized to X and initial values are also constructed for the three intermediate forms of the quotient that are maintained and updated, Q(0), QM(0), and QP(0). Additionally, a first quotient digit, $d_1$, is selected, where $0 \leq d_1 \leq r$. Finally, the remainder is updated based upon the selected quotient digit, $d_1$. Specifically, the remainder is set to $r \times Rem - d_1 \times Y$.

In processing block 520, the main iterations, j=2 to L−1, of the division calculation and on-the-fly conversion are performed. During each iteration, a new digit, $d_j$, is generated, where $-r+1 \leq d_j \leq r-1$; Q, QM, and QP are updated based upon the new digit, $d_j$, and the remainder is updated based on the new digit, $d_j$. When the iteration reaches j=L−1, one iteration before the last necessary, the main iterations are complete and processing continues to processing block 530 in which final rounding is performed.

In processing block 530, the traditional on-the-fly rounding method generates the correctly rounded result based on rounding just the last digit, $d_L$, and appending it to one of the three variables Q(L−1), QM(L−1), or QP(L−1). No carry-propagating addition is required; however, as discussed above, three potentially large variables must be maintained and each of these variables must be updated during each iteration. As a result, real estate and power consumption are negatively impacted as compared to the improved on-the-fly techniques described herein.

High-level On-the-fly Rounding Processing

Figure 6:
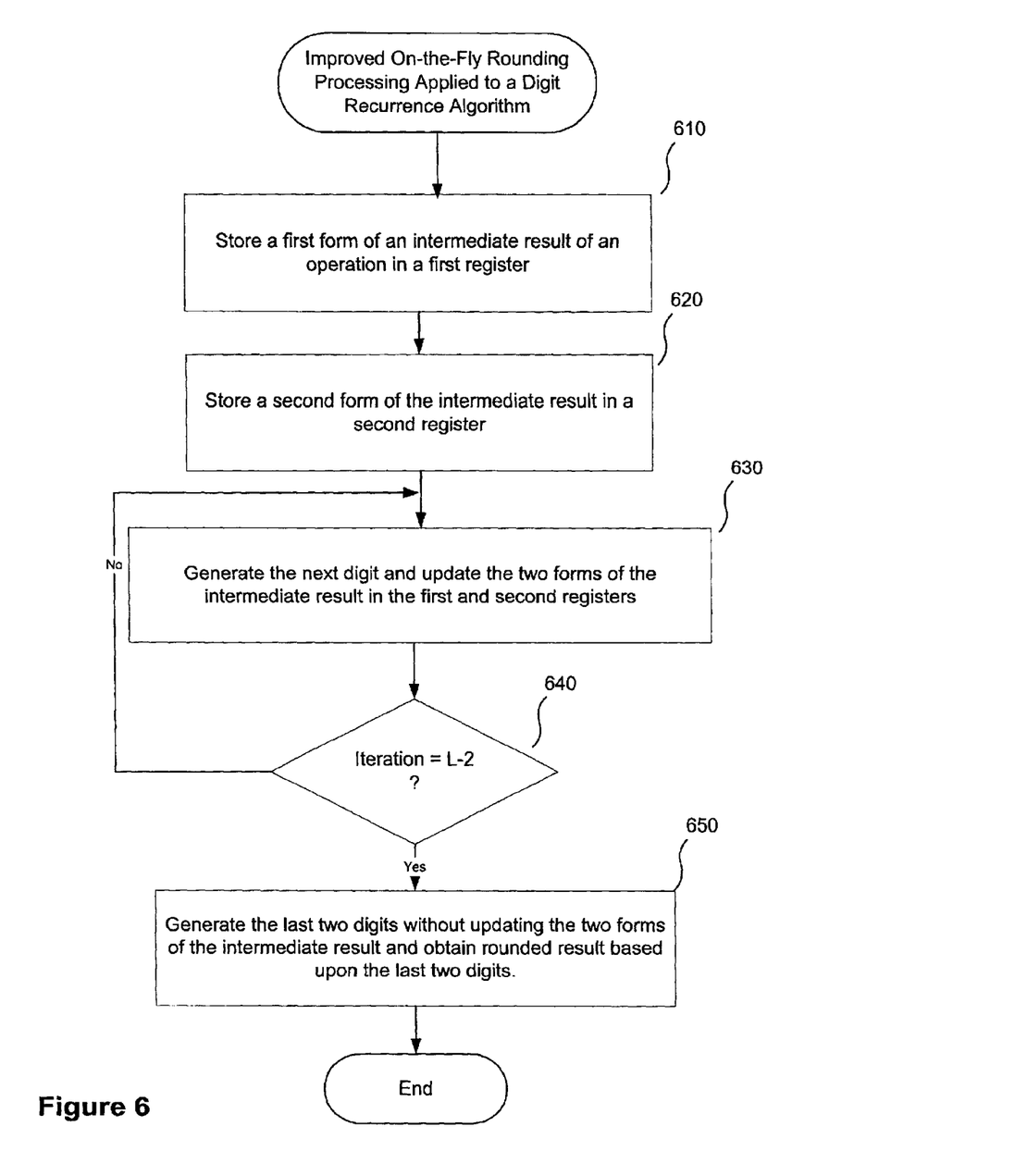
FIG. 6 is a high-level flow diagram illustrating improved on-the-fly rounding processing applied to a digit recurrence algorithm according to one embodiment of the present invention.

FIG. 6 is a high-level flow diagram illustrating improved on-the-fly rounding processing applied to a digit recurrence algorithm according to one embodiment of the present invention. Briefly, embodiments of the improved on-the-fly rounding technique seek to reduce hardware and power consumption requirements by eliminating the need for one of the forms of intermediate result, $R_j^+$, that typically requires storage and update during each iteration of the digit recurrence algorithm. According to one embodiment, the digit set from which main iteration digits, $d_j$, may be selected is restricted to between −r+1 to r−2, inclusive. Additionally the final rounded result is generated based upon manipulation of the last two digits, $d_{L-1}$ and $d_L$, rather than the last digit alone. Combining these two ingredients allows a correctly rounded result to be constructed based on the last two digits, $d_{L-1}$ and $d_L$, and $R_{L-2}$ or $R_{L-2}^-$. Advantageously, in this manner, no carry propagation addition is necessary, nor is $R_j^+$ needed for any iteration.

In one embodiment, the processing blocks described below may be fully or partially implemented by any programmable or hardcoded logic, such as Field Programmable Gate Arrays (FPGAs), TTL logic, or Application Specific Integrated Circuits (ASICs), for example. However, in alternative embodiments, the processing blocks may be fully or partially performed under the control of a programmed processor, such as processor 302.

On-the-fly rounding processing as applied to digit recurrence algorithms in general begins at processing block 610 where a first form of an intermediate result of an operation is stored in a first register. At processing block 620, a second form of the intermediate result is stored in a second register. Typically, the first and second registers are separate shift registers to allow independent high-speed left or right shifting of the intermediate results for concatenation to one end or the other of the intermediate results contained therein. However, in alternative embodiments, such as a microcode implementation of division, the storage may be fast memory, such as cache. In software implementations of digit recurrence division, the storage may be general purpose application registers.

At processing block 630, the next digit, $d_j$, is generated by accessing a lookup table, such as a SRT lookup table or a lookup table that supports both selection of quotient digits and root selection, for example. Additionally, the two forms of the intermediate result, e.g., $R_j$ and $R_j^-$, are updated. In one embodiment, at least two latest digits, $d_j$ and $d_{j-1}$, are maintained to allow the main iterations to be ceased one iteration before final rounding is performed while having two consecutive digits available for the final rounding process.

At decision block 640, a determination is made whether the main iterations of the digit recurrence algorithm are complete. In the embodiment depicted, this is accomplished by determining if the current iteration, j, is equal to L−2. If the main iterations are complete, processing continues to processing block 650, otherwise processing branches back to processing block 630 until the main iterations are complete.

At processing block 650, the last two digits, $d_{L-1}$ and $d_L$, are generated and the rounded result, $R_{rounded}$, is obtained based upon the last two digits, $d_{L-1}$ and $d_L$. Notably, there is no need to update the two forms of the intermediate result as only one of the currently available forms of the intermediate result, e.g., either $R_{L-2}$ or $R_{L-2}^-$, will become part of the final answer.

After simple rounding of $d_L$, if $d_L^{rnd}$ does not lie in the canonical set $\{0, 1, \ldots, r-1\}$, then according to one embodiment, the following adjustments are performed on $d_L^{rnd}$ and $d_{L-1}$ prior to including them as part of the rounded result:

if $d_L^{rnd} \leq -1$, then modifying $d_L^{rnd}$ and $d_{L-1}$ as follows:
  $d_L^{rnd} \leftarrow r + d_L^{rnd}$
  $d_{L-1} \leftarrow d_{L-1} - 1$
otherwise, if $d_L^{rnd} \geq r$, then modifying $d_L^{rnd}$ and $d_{L-1}$ as follows:
  $d_L^{rnd} \leftarrow d_L^{rnd} - r$
  $d_{L-1} \leftarrow d_{L-1} + 1$ Importantly, at this point, $-r \leq d_{L-1} \leq r-1$. The upper bound r−1 guarantees that no positive carry will be generated into $R_{L-2}$ and hence $R_{L-2}^+$ is not needed.

Finally, the correctly rounded result is formed by concatenating either $R_{L-2}$ or $R_{L-2}^-$ with (1) the potentially modified $d_{L-1}$ (as illustrated above, $d_{L-1}$ may be need to be adjusted by adding 1 or subtracting 1 depending upon the value of the rounded last digit, $d_L^{rnd}$) and (2) the rounded last digit, $d_L^{rnd}$, in canonical form as follows:

$$R_{rounded} = \begin{cases} (R_{L-2}, d_{L-1}, d_L^{rnd}) & d_{L-1} \geq 0 \\ (R_{L-2}^-, r + d_{L-1}, d_L^{rnd}) & d_{L-1} \leq -1 \end{cases}$$

On-the-fly Rounding Processing Applied to Division

Figure 7:
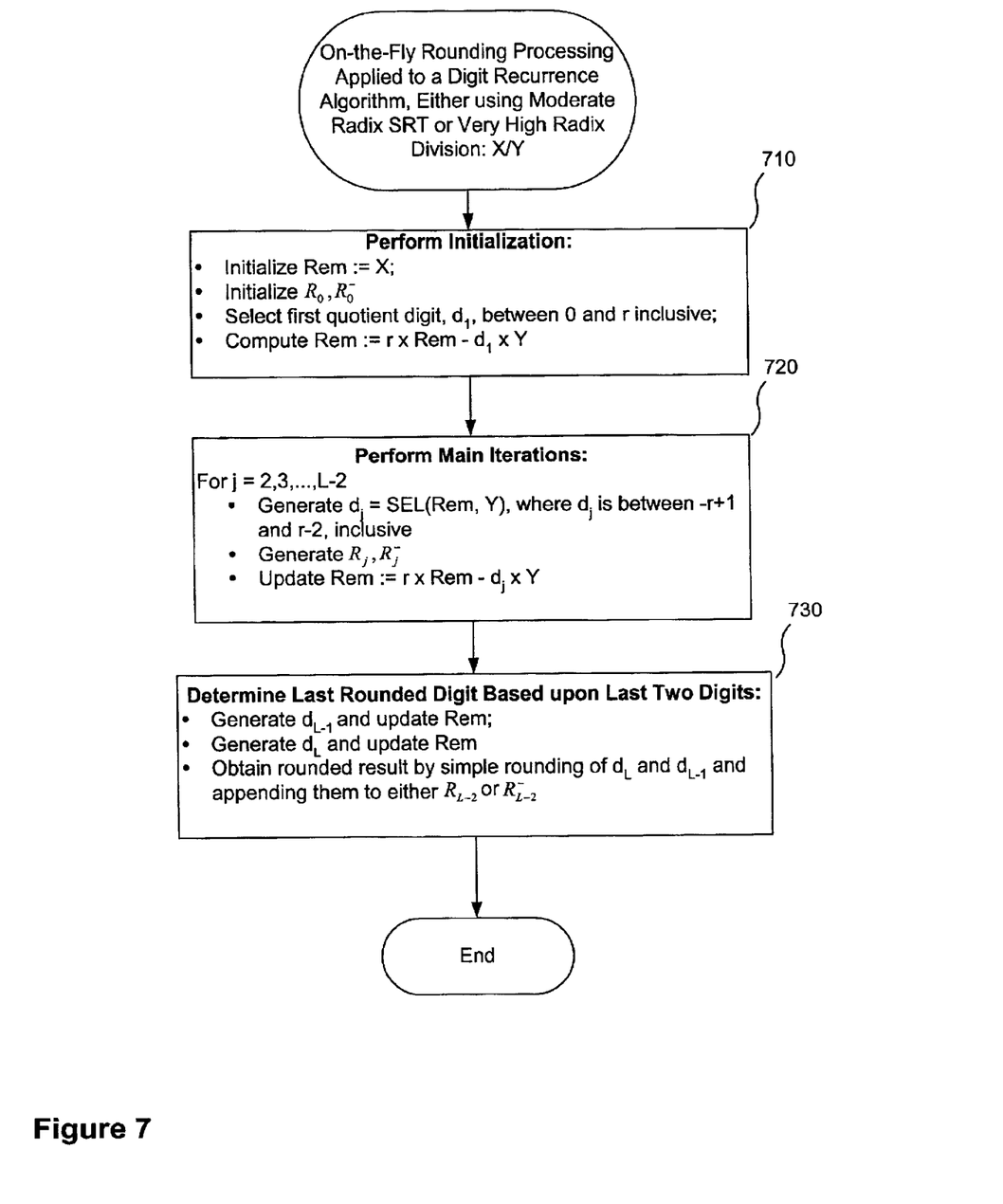
FIG. 7 is a flow diagram illustrating improved on-the-fly rounding processing applied to a digit recurrence algorithm, either using moderate radix SRT division or a very high radix division according to one embodiment of the present invention.

FIG. 7 is a flow diagram illustrating improved on-the-fly rounding processing applied to digit recurrence division, such as SRT or very high radix division, X/Y, according to one embodiment of the present invention. In processing block 710, initialization is performed. The remainder, Rem, is initialized to X and initial values are also constructed for the two intermediate forms of the quotient that are maintained and updated, $R_0$ and $R_0^-$. Additionally, a first quotient digit, $d_1$, is selected, where $0 \leq d_1 \leq r$. Finally, the remainder is updated based upon the selected quotient digit, $d_1$. Specifically, the remainder is set to $r \times Rem - d_1 \times Y$.

In processing block 720, the main iterations, $j=2$ to $L-2$, of the division calculation and on-the-fly rounding are performed. During each iteration, a new digit $d_j$, is generated, where $-r+1 \leq d_j \leq r-2$; $R_j$ and $R_j^-$ are updated based upon the new digit, $d_j$, and the remainder is updated based on the new digit, $d_j$. When the iteration reaches $j=L-2$, two iterations before the last necessary, the main iterations are complete and processing continues to processing block 730 in which final rounding is performed.

In processing block 730, the correctly rounded result is obtained based on the last two digits, $d_{L-1}$ and $d_L$, and either $R_{L-2}$ or $R_{L-2}^-$ as discussed above. Consequently, this algorithm eliminates the need for $R^+$ and the associated arithmetic and logical operations resulting in lesser real estate and power consumption requirements for implementations of on-the-fly rounding.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   maintaining a first form of an intermediate result of an operation in a first register;
   maintaining a second form of the intermediate result in a second register;
   responsive to receiving digits 1 to $L-2$ of the intermediate result from a digit recurrence unit, where L represents a number of digits that satisfies a predetermined precision for the operation, updating each of the first form and the second form of the intermediate result by register swapping or concatenation under the control of load and shift control logic and on-the-fly conversion logic;
   generating a rounded result by determining digits $d_{L-1}$ and $d_L$ and deriving from these the two digits $d'_{L-1}$ and $d_L^{rnd}$ which are then appended to either the first form of the intermediate result or the second form of the intermediate result.

2. The method of claim 1, wherein the first form of the intermediate result comprises a value $R_j$ representing a sum of intermediate digits, $d_1 r^{-1} + d_2 r^{-2} + \ldots + d_j r^{-j}$, which converges to an infinitely precise result as j tends to infinity, where r represents a radix associated with a digit-recurrence algorithm implemented by the digit-recurrence unit, j represents a current iteration of the digit recurrence algorithm, and $d_j$ represents a digit generated during iteration j of the digit-recurrence algorithm.

3. The method of claim 2, wherein the second form of the intermediate result comprises a value $R_j^-$, where $R_j^-$ differs from $R_j$ by a unit of the $j^{th}$ position, $r^{-j}$.

4. The method of claim 3, wherein said updating each of the first form and the second form of the intermediate result by register swapping or concatenation comprises updating $R_j$ and $R_j^-$ based upon $d_j$, r, and $R_{j-1}$ and $R_{j-1}^-$.

5. The method of claim 1, wherein storage typically allocated to a value, $R_j^+$, representing $R_j + r^{-j}$ in conventional digit-recurrence procedures employing on-the-fly rounding is saved by not relying upon and not maintaining $R_j^+$ during iterations 1 to $L-2$ of the digit-recurrence procedure.

6. The method of claim 1, wherein:

$$R_j = \begin{cases} (R_{j-1}, d_j) & d_j \geq 0 \\ (R_{j-1}^-, d_j + r) & d_j \leq -1 \end{cases}; \text{ and}$$

$$R_j^- = \begin{cases} (R_{j-1}, d_j - 1) & d_j \geq 1 \\ (R_{j-1}^-, d_j + r - 1) & d_j \leq 0 \end{cases}.$$

7. The method of claim 1, wherein said generating a rounded result further comprises:
   generating the rounded last digit $d_L^{rnd}$;
   if $d_L^{rnd} \leq -1$, the modifying $d_L^{rnd}$ and $d_{L-1}$ as follows:
   $d_L^{rnd} \leftarrow r + d_L^{rnd}$, and
   $d_{L-1} \leftarrow d_{L-1} - 1$; and
   otherwise, if $d_L^{rnd} \geq r$, then modifying $d_L^{rnd}$ and $d_{L-1}$ as follows:
   $d_L^{rnd} \leftarrow d_L^{rnd} - r$, and
   $d_{L-1} \leftarrow d_{L-1} + 1$.

8. The method of claim 1, wherein:
   the digits are restricted to the digit set $\{-r+1, -r+2, \ldots, r-2\}$.

9. A method comprising:
   receiving one or more operands upon which an operation is to be performed using a digit-recurrence procedure employing on-the-fly rounding;
   providing a first storage location in which an intermediate result, $R_j$, of the operation is maintained as a sum of intermediate digits, $d_1 r^{-1} + d_2 r^{-2} + \ldots + d_j r^{-j}$, where r represents a radix associated with the digit-recurrence procedure, j represents a current iteration of the digit-recurrence procedure, and $d_j$ represents a digit generated during iteration j of the digit-recurrence procedure;
   providing a second storage location in which a value, $R_j^-$, is maintained representing $R_j - r^{-j}$;
   during iterations 1 to $L-2$ of the digit-recurrence procedure, where L represents a number of digits that satisfies a predetermined precision for the operation, (1) generating $d_j$, and (2) updating $R_j$ and $R_j^-$ based upon $d_j$, r, and $R_{j-1}$ and $R_{j-1}^-$; and
   determining a rounded fractional result based upon (1) digits $d_{L-1}$ and $d_L$ and (2) $R_{L-2}$ or $R_{L-2}^-$.

10. The method of claim 9, wherein the operation comprises division.

11. The method of claim 9, wherein the operation comprises square-root.

12. The method of claim 9, wherein a value, $R_j^+$, representing $R_j + r^{-j}$ is not maintained during iterations 1 to $L-2$ of the digit-recurrence procedure, thereby saving storage typically allocated to $R_j^+$ in conventional digit-recurrence procedures employing on-the-fly rounding.

13. The method of claim 9, wherein the first and second storage locations comprise shift registers, and wherein said updating $R_j$ and $R_j^-$ based upon $d_j$, r, and $R_{j-1}$ and $R_{j-1}^-$ comprises shifting the contents of the shift registers and appending new digits.

14. The method of claim 9, wherein:

$$R_j = \begin{cases} (R_{j-1}, d_j) & d_j \geq 0 \\ (R_{j-1}^-, d_j + r) & d_j \leq -1 \end{cases}; \text{ and}$$

-continued $$R_j^- = \begin{cases} (R_{j-1}, d_j - 1) & d_j \geq 1 \\ (R_{j-1}^-, d_j + r - 1) & d_j \leq 0 \end{cases}.$$

15. The method of claim 9, wherein said determining a rounded fractional result based upon (1) digits $d_{L-1}$ and $d_L$ and (2) $R_{L-2}$ of $R_{L-2}^-$ further comprises:
   generating the digits $d_{L-1}$ and $d_L$;
   generating a rounded last digit $d_L^{rnd}$;
   if $d_L^{rnd} \leq -1$, the modifying $d_L^{rnd}$ and $d_{L-1}$ as follows:
   $d_L^{rnd} \leftarrow r + d_L^{rnd}$, and
   $d_{L-1} \leftarrow d_{L-1} - 1$; and
   otherwise, if $d_L^{rnd} \geq r$, then modifying $d_L^{rnd}$ and $d_{L-1}$ as follows:
   $d_L^{rnd} \leftarrow d_L^{rnd} - r$, and
   $d_{L-1} \leftarrow d_{L-1} + 1$.

16. The method of claim 9, wherein:
   the digits are constrained to the digit set $\{-r+1, -r+2, \ldots, r-2\}$.

17. A method comprising the steps of:
   receiving one or more operands upon which an operation is to be performed using a digit-recurrence procedure with on-the-fly rounding;
   providing a first storage location in which an intermediate result of the operation, $R_j$, is maintained, where, $R_j = d_1 r^{-1} + d_2 r^{-2} + \ldots + d_j r^{-j}$ converges to an infinitely precise result as j tends to infinity.
   r represents a radix associated with the digit-recurrence procedure,
   j represents a current iteration of the digit-recurrence procedure, and
   $d_j$ represents a digit generated during iteration j of the digit-recurrence procedure;
   providing a second storage location in which a value, $R_j^-$, is maintained representing $R_j - r^{-j}$;
   an initialization step for constructing $R_0$ and $R_0^-$;
   a main iteration step for generating digits $d_1$ through $d_j$ and updating $R_j$ and $R_j^-$; during iterations 1 to L-2 of the iterative digit-recurrence procedure, where L represents a number of digits that satisfies a predetermined precision for the operation; and
   a step for determining a rounded fractional result based upon (1) digits $d_{L-1}$ and $d_L$ and (2) $R_{L-2}$ or $R_{L-2}^-$.

18. The method of claim 17, wherein:

$$R_j = \begin{cases} (R_{j-1}, d_j) & d_j \geq 0 \\ (R_{j-1}^-, d_j + r) & d_j \leq -1 \end{cases}; \text{ and}$$

$$R_j^- = \begin{cases} (R_{j-1}, d_j - 1) & d_j \geq 1 \\ (R_{j-1}^-, d_j + r - 1) & d_j \leq 0 \end{cases}.$$

19. The method of claim 17, wherein said step for determining a rounded fractional result based upon (1) digits $d_{L-1}$ and $d_L$ and (2) $R_{L-2}$ or $R_{L-2}^-$ further comprises:
   generating the digits $d_{L-1}$ and $d_L$;
   generating a rounded last digit $d_L^{rnd}$;
   if $d_L^{rnd} \leq -1$, the modifying $d_L^{rnd}$ and $d_{L-1}$ as follows:
   $d_L^{rnd} \leftarrow r + d_L^{rnd}$, and
   $d_{L-1} \leftarrow d_{L-1} - 1$; and
   otherwise, if $d_L^{rnd} \geq r$, then modifying $d_L^{rnd}$ and $d_{L-1}$ as follows:
   $d_L^{rnd} \leftarrow d_L^{rnd} - r$, and
   $d_{L-1} \leftarrow d_{L-1} + 1$.

20. An apparatus comprising:
   a first storage means for storing an intermediate result, $R_j$, of an operation on one or more operands, the operation implemented as a digit recurrence procedure with on-the-fly rounding, where $R_j = d_1 r^{-1} + d_2 r^{-2} + \ldots + d_j r^{-j}$, r represents a radix associated with the digit-recurrence procedure, j represents a current iteration of the digit-recurrence procedure, and $d_j$ represents a digit generated during iteration j of the digit-recurrence procedure;
   a second storage means, coupled to the first storage means, for storing a value, $R_j^-$, representing $R_j - r^{-j}$;
   an update means, coupled to the first and second storage means, for updating $R_j$ and $R_j^-$ based upon $d_j$, r, and $R_{j-1}$ and $R_{j-1}^-$ during iterations 1 to L-2 of the digit-recurrence procedure;
   a digit selection means, coupled to the update means, for generating $d_j$ during iterations 1 to L-2 of the digit-recurrence procedure, where L represents a number of digits that satisfies a predetermined precision for the operation; and
   means, coupled to the first and second storage means, for determining a rounded fractional result based upon (1) digits $d_{L-1}$ and $d_L$ and (2) $R_{L-2}$ or $R_{L-2}^-$.

21. The apparatus of claim 20, wherein the operation comprises a division operation or a square-root operation.

22. The apparatus of claim 20, wherein the digit selection means supports both division and square-root operations.

23. The digit recurrence unit of claim 20, further comprising a delay element coupled to the output of the digit selection means to hold at least two iterations of digits.

24. An apparatus comprising:
   a first register to store an intermediate result, $R_j$, of an operation on one or more operands, the operation implemented as a digit recurrence procedure with on-the-fly rounding, where $R_j = d_1 r^{-1} + d_2 r^{-2} + \ldots + d_j r^{-j}$, r represents a radix associated with the digit-recurrence procedure, j represents a current iteration of the digit-recurrence procedure, and $d_j$ represents a digit generated during iteration j of the digit-recurrence procedure;
   a second register, coupled to the first register, to store a value, $R_j^-$, representing $R_j - r^{-j}$;
   a digit selection lookup table to generating $d_j$ during iterations 1 to L-2 of the digit-recurrence procedure, where L represents a number of digits that satisfies a predetermined precision for the operation;
   load and shift control logic and on-the-fly conversion logic to update $R_j$ and $R_j^-$ based upon $d_j$, r, and $R_{j-1}$ and $R_{j-1}^-$ during iterations 1 to L-2 of the digit-recurrence procedure; and
   final rounding logic to determine a rounded fractional result based upon (1) digits $d_{L-1}$ and $d_L$ and (2) $R_{L-2}$ or $R_{L-2}^-$.

25. The apparatus of claim 24, wherein the operation comprises a division operation or a square-root operation.

26. The apparatus of claim 24, wherein the digit selection means supports both division and square-root operations.

27. The apparatus of claim 24, further comprising a delay element interposed between the digit selection lookup table and the load and shift control logic and on-the-fly conversion logic to hold at least two iterations of digits.

28. A machine-readable medium having stored thereon data representing sequences of instructions, the sequences of instructions which, if executed by a processor, cause the processor to:
   maintain a first form of an intermediate result of an operation in a first register;

maintain a second form of the intermediate result in a second register;

update each of the first form and the second form of the intermediate result by register swapping or concatenation responsive to receiving digits 1 to L−2 of the intermediate result from a digit recurrence unit, where L represents a number of digits that satisfies a predetermined precision for the operation; and generate a rounded result by determining digits $d_{L-1}$ and $d_L$ and appending a rounded last digit to either the first form of the intermediate result or the second form of the intermediate result.

29. The machine-readable medium of claim 28, wherein the first form of the intermediate result comprises a value $R_j$ representing a sum of intermediate digits, $d_1 r^{-1} + d_2 r^{-2} + \ldots + d_j r^{-j}$, which converges to an infinitely precise result as j tends to infinity, where r represents a radix associated with a digit-recurrence algorithm implemented by the digit-recurrence unit, j represents a current iteration of the digit recurrence algorithm, and $d_j$ represents a digit generated during iteration j of the digit-recurrence algorithm.

30. The machine-readable medium of claim 29, wherein the second form of the intermediate result comprises a value $R_j^-$, where $R_j^-$ differs from $R_j$ by a unit of the $j^{th}$ position, $r^{-j}$.

* * * * *

UNITED STATES PATENT AND TRADEMARK OFFICE
CERTIFICATE OF CORRECTION

PATENT NO. : 6,792,443 B2
DATED : September 14, 2004
INVENTOR(S) : Tang

It is certified that error appears in the above-identified patent and that said Letters Patent is hereby corrected as shown below:

Column 5,
Line 48, delete "modern," and insert -- modem, --.

Column 12,
Line 56, delete "means" and insert -- lookup table --.

Signed and Sealed this

Twenty-fourth Day of May, 2005

JON W. DUDAS
*Director of the United States Patent and Trademark Office*